United States Patent [19]

Kitahara et al.

[11] Patent Number: 4,976,942

[45] Date of Patent: Dec. 11, 1990

[54] METHOD FOR PURIFYING GASEOUS HYDRIDES

[75] Inventors: Koichi Kitahara; Takashi Shimada, both of Kanagawa; Keiichi Iwata, Niigata; Noboru Akita, Kanagawa, all of Japan

[73] Assignee: Japan Pionics, Ltd., Tokyo, Japan

[21] Appl. No.: 412,750

[22] Filed: Sep. 26, 1989

[30] Foreign Application Priority Data

| Sep. 26, 1988 | [JP] | Japan | 63-238920 |
| Oct. 31, 1988 | [JP] | Japan | 63-273267 |
| Nov. 2, 1988 | [JP] | Japan | 63-276177 |
| Nov. 10, 1988 | [JP] | Japan | 63-282362 |
| Nov. 16, 1988 | [JP] | Japan | 63-287765 |
| Jan. 13, 1989 | [JP] | Japan | 1-4748 |
| Jan. 13, 1989 | [JP] | Japan | 1-4749 |
| Jan. 13, 1989 | [JP] | Japan | 1-4750 |
| Feb. 2, 1989 | [JP] | Japan | 1-22684 |
| Feb. 2, 1989 | [JP] | Japan | 1-22685 |

[51] Int. Cl.$^5$ .......... B01D 53/00; C01B 6/34; C01B 19/04; C01B 25/06
[52] U.S. Cl. .......... 423/294; 423/219; 423/299; 423/347; 423/509; 423/645
[58] Field of Search .......... 423/219, 294, 299, 347, 423/352, 509, 563, 645; 585/824

[56] References Cited

U.S. PATENT DOCUMENTS

| 2,806,767 | 9/1957 | Chenicek | 423/352 |
| 3,019,087 | 1/1962 | Jacob et al. | 423/347 |
| 4,505,880 | 3/1983 | Deschomps et al. | 423/563 |
| 4,565,677 | 1/1986 | Yusa | 423/347 |

FOREIGN PATENT DOCUMENTS

| 200422 | 5/1983 | German Democratic Rep. | 423/299 |
| 224229 | 7/1985 | German Democratic Rep. | 423/219 |
| 6481 | 2/1971 | Japan | 423/219 |
| 120511 | 7/1983 | Japan | 423/347 |
| 260412 | 12/1985 | Japan | 423/299 |
| 2152528 | 8/1985 | United Kingdom | 585/824 |

OTHER PUBLICATIONS

Chemical Abstract, vol. 105, 45806v (1986), (abstract of JA 260412).

Primary Examiner—Jeffrey E. Russel
Assistant Examiner—Lester Burke
Attorney, Agent, or Firm—Sughrue, Mion, Zinn, Macpeak & Seas

[57] ABSTRACT

A method for purifying a gaseous hydride, which comprises bringing a crude gaseous hydride into contact with at least one material from nickel arsenides, nickel phosphides, nickel silicides, nickel selenides, or nickel borides to remove oxygen contained in the crude gaseous hydride.

7 Claims, No Drawings

METHOD FOR PURIFYING GASEOUS HYDRIDES

FIELD OF THE INVENTION

This invention relates to a method for purifying gaseous hydride(s) and, more particularly, to a method for purifying gaseous hydrides which can remove oxygen contained in the gaseous hydrides as an impurity to an extremely low concentration.

BACKGROUND OF THE INVENTION

Gaseous hydrides such as arsine, phosphine, hydrogen selenide, silane and diborane are important as a raw material for producing a compound semiconductor such as gallium-arsenic (GaAs) or gallium-phosphorus (GaP) as an ion implantation gas, and the amount thereof used is increasing year by year. At the same time, with the increase of the integration extent of a semiconductor device, gaseous hydrides having an extremely low content of impurities have been required.

Gaseous hydrides for use in the production of semiconductors are generally commercially available as the gaseous hydride itself or in the form of being diluted with hydrogen gas or an inert gas.

These gaseous hydrides contain oxygen and moisture as impurities and of these impurities, moisture can be removed by a dehumidifying agent such a synthetic zeolite.

The oxygen content in commercially available gaseous hydrides is usually 10 ppm or less, but, recently, gaseous hydrides contained in a bomb having a relatively low oxygen content of from 0.1 to 0.5 ppm are commercially available.

There are almost no methods for efficiently removing oxygen contained in gaseous hydrides but a method for purifying arsine by bringing a material having an adsorptive power to arsine, such as active carbon or a synthetic zeolite, into contact with arsine to reduce the oxygen content to 1 ppm or less is proposed in, for example, JP-A-62-78116 (the term "JP-A" as used herein refers to a "published unexamined Japanese patent application").

However, gaseous hydrides having an oxygen content to an extent of slightly below 1 ppm cannot sufficiently meet the requirement in a recent semiconductor production process and it has strongly been desired to reduce the oxygen content in gaseous hydrides to 0.1 ppm or less.

Further, since such gaseous hydrides are sometimes contaminated by the entrance of impurities such as air in supplying steps to an apparatus for producing semiconductors such as a step of connecting a gaseous hydride bomb to the apparatus or a step of changing pipes, it is desired to finally remove impurities immediately before the apparatus.

SUMMARY OF THE INVENTION

As the result of serious investigations for efficiently removing oxygen contained in gaseous hydrides to an extremely low concentration, it has been found that the oxygen concentration can be reduced to 0.1 ppm or less and, as the case may be, 0.01 ppm or less by bringing the gaseous hydrides into contact with an arsenide, a phosphide, etc., of nickel. The present invention is accomplished based on this finding.

Accordingly, an object of this invention is to provide a method for purifying gaseous hydrides, which can remove oxygen contained in the gaseous hydrides as an impurity to an extremely low concentration.

The method for purifying gaseous hydrides according to this invention comprises bringing crude gaseous hydrides into contact with at least one member selected from the group consisting of nickel arsenides, nickel phosphides, nickel silicides, nickel selenides and nickel borides to remove oxygen contained in the crude gaseous hydrides.

DETAILED DESCRIPTION OF THE INVENTION

This invention is applied to remove oxygen as an impurity contained in a gaseous hydride itself or a gaseous hydride diluted with hydrogen gas (hydrogen gas base) or an inert gas (inert gas base) such as nitrogen or argon (hereinafter, these gaseous hydrides are referred to as "crude gaseous hydrides").

A gaseous hydride which is purified in this invention is a gaseous hydride such as arsine, phosphine, hydrogen selenide, silane or diborane which is mainly used for the production of semiconductors.

The nickel arsenides, nickel phosphides, nickel silicides, nickel selenides, and nickel borides (hereinafter referred to as "nickel A-ide") used in this invention are nickel arsenides such as $NiAs_2$, $NiAs$, $Ni_3As_2$ and $Ni_{11}As_8$, nickel phosphides such as $Ni_3P$, $Ni_5P_2$, $Ni_2P$, $Ni_3P_2$, $Ni_2P_3$, $NiP_2$, $NiP_3$ and $Ni_6P_5$, nickel silicides such as $Ni_3Si$, $Ni_2Si$, $Ni_3Si_2$ and $Ni_2Si_3$, nickel selenides such as $NiSe$, $NiSe_2$ and $Ni_3Se_4$, and nickel borides such as $Ni_2B$ and $NiB$, which are generally known as nickel compounds, as well as various compounds formed by combining nickel and arsenic, phosphorous, silicon, selenium or boron (hereinafter, such an element is referred to as "element A") in other forms.

Nickel A-ide can be obtained by various methods. In these methods, an example of a simple method is a method where the nickel A-ide can be easily obtained by bringing nickel into contact with at least one of the gaseous hydrides such as arsine, phosphine and silane.

In this case, the nickel which is used to form the nickel A-ide is metallic nickel or a compound mainly composed of a nickel compound which is easily reduced, such as a nickel oxide.

Further, such nickel may contain small amounts of other metal components than nickel, such as chromium, iron and cobalt.

The nickel can be used alone or in a form that the nickel is supported by a catalyst carrier, but for the purpose of increasing the contact efficiency between the surface the nickel and the gas, the form that the nickel is supported by a catalyst carrier is generally preferred.

Examples of the method for supporting the nickel on a carrier are a method wherein a powder of a carrier such as diatomaceous earth, alumina, silica alumina, alumina silicate or calcium silicate is dispersed in an aqueous solution of a nickel salt, an alkali is further added to the mixture to deposit the nickel component onto the carrier powder, the mixture is filtered, a cake is thus obtained, if necessary, washing with water, the cake is dried at temperature of from 120° C. to 150° C., the cake is calcined at temperature of 300° C. or more, and the calcined product is ground, and a method wherein an inorganic nickel salt such as $NiCO_3$, $Ni(OH)_2$ or $Ni(NO_3)_2$ or an organic nickel salt such as $NiC_2O_4$ or $Ni(CH_3COO)_2$ is calcined, the calcined product is ground, and the ground product is mixed with heat-resistant cement, followed by calcining the mixture.

The calcined product is usually formed into moldings by extrusion molding, tablet molding, etc., and the moldings are used as they are or after being ground into proper sizes. As the molding method, a dry method or a wet method can be used, and in this case, a small amount of water, a lubricant, etc., may be used.

Examples of a nickel series catalyst are steam reforming catalysts such as C11-2-03 (NiO-cement), C11-2-06 (NiO-refractory), C11-2 (Ni-calcium aluminate), C11-9 (Ni-alumina), etc.; hydrogenation catalysts such as C46-5 (Ni-silica alumina), C46-6 (Ni-calcium silica), C46-7 (Ni-diatomaceous earth), C46-8 (Ni-silica), C36 (Ni-Co-Cr-alumina), etc.; gasification catalysts such as XC99 (NiO), etc.; and hydro-reforming catalysts such as C20-7 (Ni-Mo-alumina), etc. (the abovedescribed names are trade names made by Toyo CCI K.K.); gasification denaturation catalysts such as N-174 (NiO), etc.; and gasification catalysts such as N-185 (NiO), etc., (the above-described names are trade names made by JGC Corporation), which are commercially available. A proper catalyst is selected from the above catalysts.

It is important that a catalyst wherein reduced nickel, nickel oxide, etc., is finely dispersed and having a large surface area giving high contact efficiency with the gas is used.

The specific surface area of the catalyst is in the range of generally from 10 to 300 m$^2$/g, and preferably from 30 to 250 m$^2$/g, as a value measured by the BET method.

The content of nickel in the catalyst is generally from 5 to 95% by weight, and preferably from 20 to 95% by weight, calculated as metallic nickel.

If the nickel content is less than 5% by weight, the deoxidation ability becomes low, while if the nickel content is higher than 95% by weight, there is a possibility of causing sintering at the reduction by hydrogen to reduce the activity of the catalyst.

The A-ation of nickel to form nickel A-ide can be carried out by bringing a gaseous hydride into contact with reduced nickel, nickel oxide, etc., and in the case of using nickel oxide, etc., other than reduced nickel, it is preferred to previously reduce the same by hydrogen reduction to form reduced nickel.

The hydrogen reduction of nickel oxide can be carried out by passing a mixed gas of hydrogen and nitrogen through a column containing nickel oxide at a linear velocity (LV) of about 1 cm/sec. and at a temperature of about 350° C. or lower. In this case, since the reaction is an exothermic reaction, it is required to control the system such that the temperature of the system does not increase rapidly. Further, when the reduction is carried out using hydrogen-base arsine, phosphine, silane, etc., the A-ation simultaneously occurs and hence this embodiment is convenient.

The A-ation is generally carried out by packing a pipe such as a purification pipe, etc., with nickel alone or nickel supported on a carrier and passing therethrough a gaseous hydride gas or a gas containing a gaseous hydride.

The concentration of the gaseous hydride used in the A-ation is generally at least 0.1% by volume, and preferably at least 1% by volume. If the gaseous hydride concentration is less than 0.1% by volume, the time required to complete the reaction becomes uneconomically long.

The A-ation can be carried out at room temperature (e.g., 15°–30° C.), but since the reaction is an exothermic reaction as described above and also as the gaseous hydride concentration increases, the temperature tends to become higher. Therefore, it is preferred to control the flow rate of the gaseous hydride so that the temperature is kept 250° C. or less, and preferably 200° C. or less.

The completion of the A-ation reaction can be determined by the decrease of the amount of heat generated or the increase of the discharging amount of the gaseous hydride from the outlet of a pipe.

The nickel A-ide obtained by the A-ation of nickel may then be filled in another purification pipe, and a crude gaseous hydride is passed therethrough to remove oxygen gas contained in the crude gaseous hydride. However, since the nickel A-ide has generally a strong toxicity and, hence, must be handled with great care, it is preferred that the A-ation is, from the first, carried out in a purification pipe for a crude gaseous hydride gas to form the nickel A-ide and a crude gaseous hydride to be purified is supplied into the purification pipe containing the nickel A-ide to remove oxygen therefrom.

The purification of a crude gaseous hydride is carried out by passing the crude gaseous hydride through a purification pipe packed with the nickel A-ide, and oxygen contained in the crude gaseous hydride as an impurity is removed therefrom by bringing the crude gaseous hydride into contact with the nickel A-ide.

The oxygen concentration in the crude gaseous hydride to be purified by the method of this invention is generally 100 ppm or less. If the oxygen concentration is higher than 100 ppm, the amount of heat generated in the purification step is increased and hence a means for removing heat is required according to the conditions for the purification.

The length of the packed column of the nickel A-ide packed in the purification pipe is generally from 50 to 1,500 mm from the practical standpoint. If the length of the packed column is shorter than 50 mm, the oxygen removing rate tends to reduce and if the packed length is longer than 1,500 mm, the pressure loss tends to become large.

The linear velocity (LV) of the crude gaseous hydride in pipe at the purification depends upon the oxygen concentration of the crude gaseous hydride supplied and the operation condition of the purification step, but is generally 100 cm/sec. or less, and preferably 30 cm/sec. or less.

The contact temperature of the gaseous hydride and the nickel A-ide is about 200° C. or less, and preferably from 0° to 100° C. as the temperature of the gas supplied to the inlet of the purification pipe, and is generally room temperature without need of particular heating or cooling.

There is no particular restriction on the pressure and the purification can be carried out at atmospheric pressure, reduced pressure, or under pressure. However, the pressure is usually 20 kg/cm$^2$ abs. or less, and preferably from 0.1 to 10 kg/cm$^2$ abs.

The existence of a small amount of moisture in the crude gaseous hydride to be purified does not give a harmful influence on the deoxidation ability of the nickel A-ide and furthermore, when a porous carrier, etc., is used for the catalyst, moisture is simultaneously removed according to the nature of the carrier.

In this invention, a moisture removing step by a dehumidifying agent such as synthetic zeolite can be properly employed, if desired and necessary, in the oxygen removing step by the nickel A-ide, whereby moisture can be completely removed and the purified gaseous hydride having a very high purity can be obtained.

According to the method of this invention, oxygen in a crude gaseous hydride can be removed to a very low concentration of 0.1 ppm or less, or further 0.01 ppm or less, which has hitherto been difficult in conventional techniques, and a purified gaseous hydride having a very high purity, which has been desired in semiconductor producing industries, etc., can be obtained.

This invention is further described in more detail by reference to the following examples, which should not be construed to limit the scope of the invention.

EXAMPLES 1 TO 25

Reduction of Nickel

A commercially available nickel catalyst (N-111, trade name, made by JGC Corporation) was used. The composition of the catalyst was in the form of Ni +NiO, containing 45 to 47% by weight of Ni, 2 to 3% by weight of Cr, 2 to 3% by weight of Cu, 27 to 29% by weight of diatomaceous earth and 4 to 5% by weight of graphite, and was a molding having a diameter of 5 mm and a height of 4.5 mm.

The nickel catalyst was ground into particles of 8 to 10 mesh and 85 ml of the particles were packed in a quartz purification pipe having an inside diameter of 19 mm and a length of 400 mm at a packed length of 300 mm (packed density 1.0 g/ml).

After reducing the nickel catalyst by passing therethrough hydrogen gas at temperature of 150° C. and a flow rate of 595 cc/min. (LV: 3.6 cm/sec.) for 3 hours, the reduced nickel was cooled to room temperature.

Formation of Nickel A-ide

Through the purification pipe containing reduced nickel was passed hydrogen gas containing a gaseous hydride for forming the nickel A-ide in an amount of 10% by volume in the case of arsine, phosphine or silane, 3% by volume in the case of hydrogen selenide, or 2.5% by volume in the case of diborane at a flow rate of 510 cc/min. (LV: 3 cm/sec.) to form the nickel A-ide.

In this case, the room temperature was 25° C. but the temperature of the gas at the outlet of the pipe was raised to a range of from 35° to 85° C. by the reaction heat in the formation of the nickel A-ide, although the temperature differed according to the kind and concentration of the gaseous hydride. Thereafter, the temperature of the gas at the outlet gradually lowered and became room temperature after 3 to 8 hours, thereby obtaining the nickel A-ide.

The pipe containing the product was purged as it was by hydrogen gas for 3 hours for the purification of the crude gaseous hydride.

25 purification pipes for 5 kinds of the nickel A-ide, 5 pipes for each kind of the nickel A-ide, were prepared.

Purification of Gaseous Hydride

Each gaseous hydride was purified. When through the purification pipe containing the nickel A-ide there was passed hydrogen-base arsine, phosphine, silane, hydrogen selenide or diborane containing oxygen as an impurity at a flow rate of 1,700 cc/min. (LV: 10 cm/sec.) and when the oxygen concentration in the gas at the outlet of the pipe was measured using a white phosphorus emission type oxygen analyzer (the lower limit of the measurable concentration was 0.01 ppm), oxygen was not detected, which showed that the oxygen content was below 0.01 ppm. Even after 100 minutes since the initiation of the purification, the oxygen concentration in the gas at the outlet was also below 0.01 ppm.

In Examples 1, 7, 13, 19 and 25, the flow rate of the gas was increased to 6,800 cc/min. (LV: 40 cm/sec.), which was 4 times higher than the initial flow rate, but the oxygen concentration of the gas at the outlet was below 0.01 ppm. After keeping the same state for 300 minutes, each gas to be purified was changed to a hydrogen-base crude gaseous hydride containing 10% by volume of the initial content (in the case of arsine, phosphine or silane), 3% by volume of the initial content (in the case of hydrogen selenide) or 2.5% by weight of the initial content (in the case of diborane), each containing 50 ppm of oxygen, the flow rate of each gas was changed to 1,700 cc/min., and the gas was then passed for 300 hours. In these cases, the oxygen concentration of each gas at the outlet was 0.01 ppm or less.

These results are shown in Table 1 below.

TABLE 1

| Example | Nickel A-ide | Gas to Be Treated | (H$_2$-based) Concentration of Gas (vol %) | O$_2$ Concentration at Inlet (ppm) | O$_2$ Concentration at Outlet (ppm) |
|---|---|---|---|---|---|
| 1 | NiAs | Arsine | 10 | 0.17 | 0.01 or less |
| 2 | " | Phosphine | 10 | 0.08 | " |
| 3 | " | Silane | 10 | 0.05 | " |
| 4 | " | Hydrogen Selenide | 3 | 0.50 | " |
| 5 | " | Diborane | 2.5 | 0.05 | " |
| 6 | NiP | Arsine | 10 | 0.17 | " |
| 7 | " | Phosphine | 10 | 0.08 | " |
| 8 | " | Silane | 10 | 0.05 | " |
| 9 | " | Hydrogen Selenide | 3 | 0.50 | " |
| 10 | " | Diborane | 2.5 | 0.05 | " |
| 11 | NiSi | Arsine | 10 | 0.17 | " |
| 12 | " | Phosphine | 10 | 0.08 | " |
| 13 | " | Silane | 10 | 0.05 | " |
| 14 | " | Hydrogen Selenide | 3 | 0.50 | " |
| 15 | " | Diborane | 2.5 | 0.05 | " |
| 16 | NiSe | Arsine | 10 | 0.17 | " |
| 17 | " | Phosphine | 10 | 0.08 | " |
| 18 | " | Silane | 10 | 0.05 | " |
| 19 | " | Hydrogen Selenide | 3 | 0.50 | " |
| 20 | " | Diborane | 2.5 | 0.05 | " |
| 21 | NiB | Arsine | 10 | 0.17 | " |
| 22 | " | Phosphine | 10 | 0.08 | " |
| 23 | " | Silane | 10 | 0.05 | " |
| 24 | " | Hydrogen Selenide | 3 | 0.50 | " |
| 25 | " | Diborane | 2.5 | 0.05 | " |

EXAMPLES 26 TO 37

Formation of Nickel A-ide

Reduced nickel was prepared in a purification pipe in the same manner as in Examples 1 to 25 described above and after passing therethrough a 100% crude gaseous hydride (arsine, phosphine, silane or hydrogen selenide) for 3 hours at a flow rate of 51 cc/min. (LV: 0.3 cm/sec.) to form a nickel A-ide, the system was cooled to room temperature and the pipe was purged as it was with hydrogen gas for 3 hours. 12 Purification pipes for 3 kinds of the nickel A-ide, 3 pipes for each kind of the nickel A-ide, were prepared.

Purification of Crude Gaseous Hydride

When a 100% crude gaseous hydride containing oxygen as an impurity was passed through each of the purification pipes at a flow rate of 850 cc/min. (LV: 5 cm/sec.) and the oxygen concentration in the gas at the outlet was measured, the oxygen concentration was 0.01 ppm or less in each case. When the gas was further passed for 10 hours in such a state, the oxygen concentration in the gas at the outlet was also 0.01 ppm or less. The results are shown in Table 2 below.

TABLE 2

| Example | Nickel A-ide | Gas to Be Treated | Concentration of Gas (vol %) | $O_2$ Concentration at Inlet (ppm) | $O_2$ Concentration at Outlet (ppm) |
|---|---|---|---|---|---|
| 26 | NiAs | Arsine | 100 | 0.05 | 0.01 or less |
| 27 | " | Phosphine | " | 0.05 | " |
| 28 | " | Silane | " | 0.05 | " |
| 29 | NiP | Arsine | " | 0.05 | " |
| 30 | " | Phosphine | " | 0.05 | " |
| 31 | " | Silane | " | 0.05 | " |
| 32 | NiSi | Arsine | " | 0.05 | " |
| 33 | " | Phosphine | " | 0.05 | " |
| 34 | " | Silane | " | 0.05 | " |
| 35 | NiSe | Arsine | " | 0.17 | " |
| 36 | " | Phosphine | " | 0.08 | " |
| 37 | " | Hydrogen Selenide | " | 0.08 | " |

EXAMPLES 38 TO 42

Formation of Nickel A-ide

Reduced nickel was prepared in five purification pipes by the same manner as in Examples 1 to 25.

Through each of the purification pipes was passed a hydrogen gas containing a gaseous hydride in an amount of 10% by volume in the case of arsine, phosphine or silane or 3% by volume in the case of hydrogen selenide or diborane at a flow rate of 510 cc/min. (LV: 3 cm/sec.) to form each of the nickel A-ides.

Purification of Crude Gaseous Hydride

When a nitrogen-based crude gaseous hydride containing oxygen as an impurity was passed through each of the purification pipes at a flow rate of 850 cc/min. (LV: 5 cm/sec.) and the oxygen concentration in the gas at the outlet was measured, the concentration was 0.01 ppm or less in each case. The gas was further passed for 10 hours in the same state but the oxygen concentration in the gas at the outlet was 0.01 ppm or less. The results are shown in Table 3below.

TABLE 3

| | | | ($N_2$-based) | | |
|---|---|---|---|---|---|
| Example | Nickel A-ide | Gas to Be Treated | Concentration of Gas (vol %) | $O_2$ Concentration at Inlet (ppm) | $O_2$ Concentration at Outlet (ppm) |
| 38 | NiAs | Arsine | 10 | 0.22 | 0.01 or less |
| 39 | NiP | Phosphine | 10 | 0.22 | " |
| 40 | NiSi | Silane | 10 | 0.20 | " |
| 41 | NiSe | Hydrogen Selenide | 3 | 0.30 | " |
| 42 | NiB | Diborane | 3 | 0.20 | " |

EXAMPLES 43 TO 47

Preparation of Nickel Catalyst

In 3 liters of water was dissolved 454 g of Al($NO_3$)$_3$.9$H_2O$ and the resulting solution was cooled to a temperature of from 5° to 10° C. by an ice bath. While stirring the solution vigorously, a solution of 200 g of NaOH dissolved in 1 liter of water cooled to a temperature of from 5° to 10° C. was added dropwise to the solution over a period of 2 hours to form sodium aluminate.

101 g of Ni($NO_3$)$_2$.6$H_2O$ was dissolved in 600 ml of water, 45 ml of concentrated nitric acid was added to the solution, and the mixture was cooled to a temperature of from 5° to 10° C. The mixture was then added to the sodium aluminate solution obtained above with stirring vigorously over a period of 1 hour.

Precipitates thus formed were collected by filtration and washed 6 times each with 2 liters of water with stirring for 15 minutes to form the neutral precipitates. The precipitates thus obtained were broken into fine pieces, and after drying them at 105° C. for 16 hours in an air bath, the fine pieces were ground. The ground particles were sieved and particles of from 12 to 24 mesh were collected. The catalyst thus obtained contained 29.5% by weight of nickel oxide (NiO).

Formation of Nickel A-ide

In the same type of purification pipe as used in Examples 1 to 25 was packed 85 ml (65 g) of the catalyst and hydrogen gas was then passed therethrough at a temperature of 350° C. and a linear velocity (LV) of 1.0 cm/sec. for 16 hours to reduce the nickel. Thus, five purification pipes were prepared.

Through each of the purification pipes was passed hydrogen gas containing a crude gaseous hydride in an amount of 10% by volume in the case of arsine, phosphine or silane or 3% by weight in the case of hydrogen selenide or diborane at a flow rate of 510 cc/min. (LV: 3 cm/sec.) to form each of the nickel A-ides.

Purification of Crude Gaseous Hydride

When a hydrogen-based crude gaseous hydride containing oxygen as an impurity was passed through each of the purification pipes at a flow rate of 1,700 cc/min. (LV: 10 cm/sec.) and the oxygen concentration in the gas at the outlet was measured, the concentration was 0 01 ppm or less. When the gas was further passed for 10 hours in the same state, the oxygen concentration in the gas at the outlet was also 0.01 ppm or less.

The results are shown in Table 4.

TABLE 4

| | | | ($H_2$-based) | | |
|---|---|---|---|---|---|
| Example | Nickel A-ide | Gas to Be Treated | Concentration of Gas (vol %) | $O_2$ Concentration at Inlet (ppm) | $O_2$ Concentration at Outlet (ppm) |
| 43 | NiAs | Arsine | 10 | 0.17 | 0.01 or less |
| 44 | NiP | Phosphine | 10 | 0.08 | " |
| 45 | NiSi | Silane | 10 | 0.05 | " |
| 46 | NiSe | Hydrogen Selenide | 3 | 0.50 | " |
| 47 | NiB | Diborane | 3 | 0.05 | " |

EXAMPLES 48 to 67

Preparation of Nickel Catalyst

A nickel catalyst was prepared in the same manner as in Examples 43 to 47.

Formation of Nickel A-ide

In the same type purification pipe as used in Examples 43 to 47 was packed 85 ml (65 g) of the nickel catalyst thus obtained at a packed density of 0.77 g/ml and hydrogen gas was passed through the pipe at 150° C. and at a linear velocity of (LV) of 1.0 cm/sec. for 16 hours to reduce the nickel. Thus, 20 purification pipes were prepared.

Through each of the purification pipes was passed a nitrogen gas containing a crude gaseous hydride for forming the nickel A-ide in an amount of 10% by volume in the case of arsine, phosphine or silane or 3% by volume in the case of hydrogen selenide or diborane at a flow rate of 510 cc/min. (LV: 3 cm/sec.) to form the nickel A-ide. Thus, 25 purification pipes, five pipes for each nickel A-ide, were prepared.

Preparation of Crude Gaseous Hydride

When a nitrogen-based crude gaseous hydride containing oxygen as an impurity was passed through each of the pipes at a flow rate of 1,700 cc/min. (LV: 10 cm/sec.) and the oxygen concentration in the gas at the outlet was measured, the oxygen concentration was 0.01 ppm or less. When the gas was further passed for an additional 100 minutes, the oxygen concentration in the gas at the outlet was also 0.01 ppm or less. The results are shown in Table 5 below.

COMPARISON EXAMPLES 1 TO 5

Active carbon (coconut shell carbon) was ground into pieces of 8 to 24 mesh, 48 g of the ground active carbon was packed in the same type of purification pipe as used in Example 1 in a packed height of 30 mm (packed density 0.57 g/ml), the packed active carbon was heat-treated in a helium gas stream at a temperature of from 270° to 290° C. for 4 hours, and the pipe was cooled to room temperature.

When a hydrogen-based crude gaseous hydride containing oxygen as an impurity as shown in Table 6 below was passed through the purification pipe at a flow rate of 1,700 cc/min. (LV: 10 cm/sec.) and the oxygen concentration in the gas at the outlet was measured, the oxygen concentration was scarcely reduced. When the gas was passed in the same state for further 2 hours, no change was observed. The results are shown in Table 6.

TABLE 5

| Example | Nickel A-ide | Gas to Be Treated | ($N_2$-based) Concentration of Gas (vol %) | $O_2$ Concentration at Inlet (ppm) | $O_2$ Concentration at Outlet (ppm) |
|---|---|---|---|---|---|
| 48 | NiAs | Phosphine | 10 | 0.22 | 0.01 or less |
| 49 | " | Silane | 10 | 0.05 | " |
| 50 | " | Hydrogen Selenide | 3 | 0.30 | " |
| 51 | " | Diborane | 3 | 0.20 | " |
| 52 | NiP | Arsine | 10 | 0.22 | " |
| 53 | " | Silane | 10 | 0.05 | " |
| 54 | " | Hydrogen Selenide | 3 | 0.30 | " |
| 55 | " | Diborane | 3 | 0.20 | " |
| 56 | NiSi | Arsine | 10 | 0.22 | " |
| 57 | " | Phosphine | 10 | 0.22 | " |
| 58 | " | Hydrogen Selenide | 3 | 0.30 | " |
| 59 | " | Diborane | 3 | 0.20 | " |
| 60 | NiSe | Arsine | 10 | 0.22 | " |
| 61 | " | Phosphine | 10 | 0.22 | " |
| 62 | " | Silane | 10 | 0.05 | " |
| 63 | " | Diborane | 3 | 0.20 | " |
| 64 | NiB | Arsine | 10 | 0.22 | " |
| 65 | " | Phosphine | 10 | 0.22 | " |
| 66 | " | Silane | 10 | 0.05 | " |
| 67 | " | Hydrogen Selenide | 3 | 0.30 | " |

TABLE 6

| Comparison Example | Deoxidizer | Gas to Be Treated | ($H_2$-based) Concentration of Gas (vol %) | $O_2$ Concentration at Inlet (ppm) | $O_2$ Concentration at Outlet (ppm) |
|---|---|---|---|---|---|
| 1 | Active Carbon | Arsine | 10 | 0.17 | 0.17 |
| 2 | Active Carbon | Phosphine | 10 | 0.08 | 0.08 |
| 3 | Active Carbon | Silane | 10 | 0.15 | 0.10 |
| 4 | Active Carbon | Hydrogen Selenide | 3 | 0.50 | 0.50 |
| 5 | Active Carbon | Diborane | 2.5 | 0.05 | 0.05 |

While the invention has been described in detail and with reference to specific embodiments thereof, it will be apparent to one skilled in the art that various changes and modifications can be made therein without departing from the spirit and scope thereof.

What is claimed is:

1. A method for purifying a gaseous hydride, which comprises bringing a crude gaseous hydride into contact with at least one member selected from the group consisting of nickel arsenides, nickel phosphides, nickel silicides, nickel selenides, and nickel borides to remove oxygen contained in the crude gaseous hydride.

2. The method as claimed in claim 1, wherein the crude gaseous hydride is at least one selected from the group consisting of arsine, phosphine, silane, hydrogen selenide and diborane.

3. The method as claimed in claim 2, wherein the crude gaseous hydride is diluted with hydrogen gas or an inert gas.

4. The method as claimed in claim 1, wherein the nickel arsenides, nickel phosphides, nickel silicides, nickel selenides and nickel borides are obtained by bringing nickel into contact with arsine, phosphine, silane, hydrogen selenide and diborane, respectively.

5. The method as claimed in claim 1, wherein the contact of the crude gaseous hydride with nickel arsenides, nickel phosphides, nickel silicides, nickel selenides or nickel borides for removing oxygen contained therein is carried out by, packing nickel in a purification pipe, passing a gaseous hydride therethrough to form nickel arsenides, nickel phosphides, nickel silicides, nickel selenides or nickel borides, and then passing the crude gaseous hydride through the purification pipe.

6. The method as claimed in claim 5, wherein the nickel packed in the purification pipe is supported by a catalyst carrier, the specific area of the whole catalyst is in the range of from 10 to 300 m$^2$/g, and the content of nickel is in the range of from 5 to 95% by weight, calculated as metallic nickel.

7. The method as claimed in claim 5, wherein the flow rate of the crude gaseous hydride passing through the purification pipe is 100 cm/sec. or less in linear velocity (LV) and the temperature of the gas at the inlet of the purification pipe is 200° C. or less.

* * * * *